Feb. 24, 1970  R. PORCELLO  3,497,228
STAIR CLIMBING VEHICLE
Filed June 18, 1968
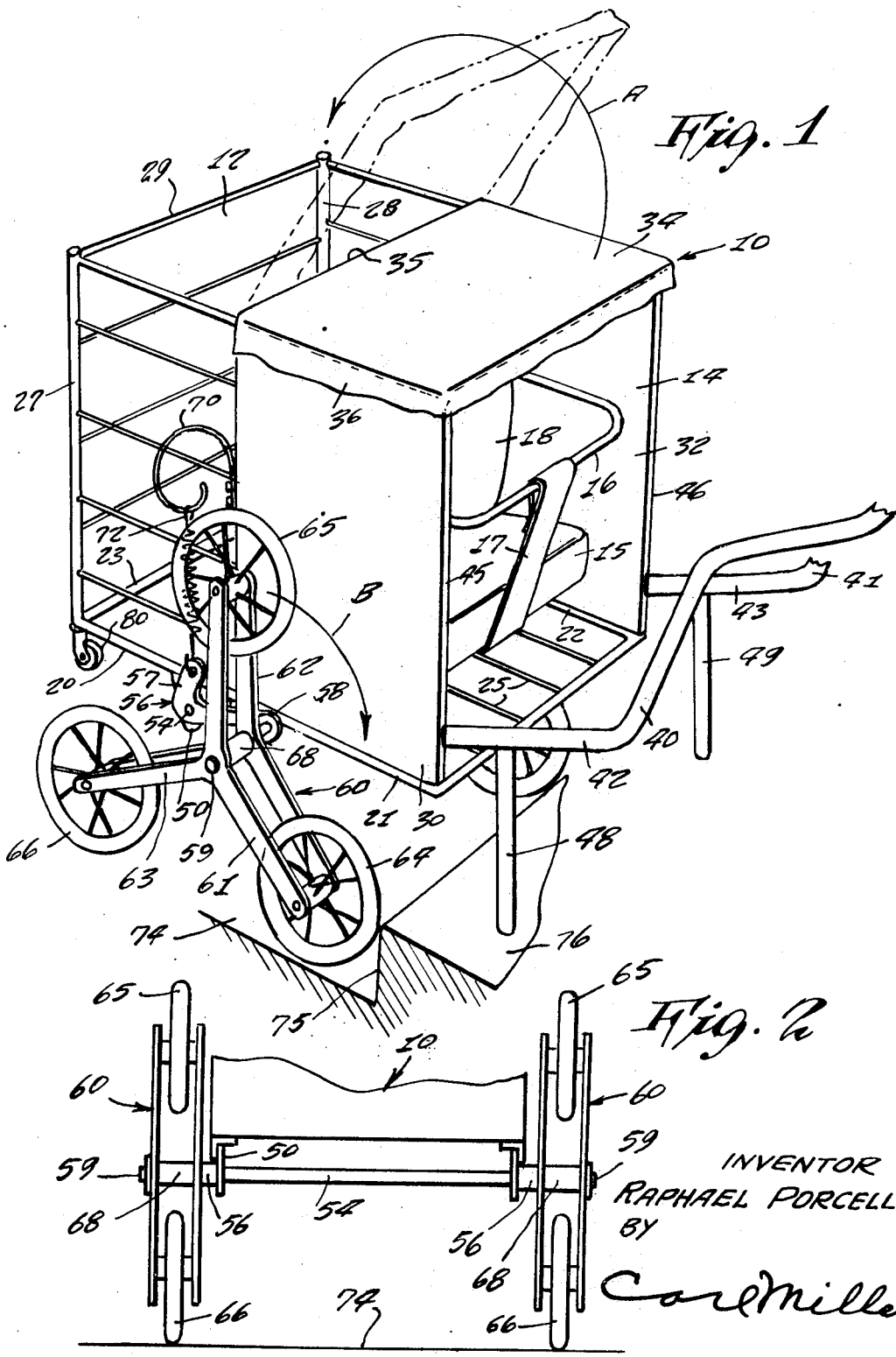
INVENTOR
RAPHAEL PORCELLO
BY
Carl Miller
ATTORNEY

United States Patent Office 3,497,228
Patented Feb. 24, 1970

3,497,228
STAIR CLIMBING VEHICLE
Raphael Porcello, Knickerbocker Station, Box 286,
New York, N.Y. 10002
Filed June 18, 1968, Ser. No. 738,042
Int. Cl. B62b 9/02, 7/04
U.S. Cl. 280—5.26
10 Claims

ABSTRACT OF THE DISCLOSURE

A stair or curb climbing vehicle having a body divided into two compartments, a front compartment open at its top and a rear compartment open at its front. The rear compartment may be provided with closed sides and a seat therein for an infant with restraining and holding means. A swingable closure top is provided for the rear compartment which may be swung back to provide a closure for the open top of the front compartment. The body is mounted on chassis frame having a pair of transversely opposed brackets supporting an axle. Mounted on each terminal end of the axle is a bell-crank lever, a lower arm thereof carrying a stub axle on which is rotatably mounted a three-arm spider wheel support with each arm rotatably mounting a wheel at its free terminal end. Spring means connects the other arm of the bell crank lever to a fixed part of the body. A caster wheel is mounted on each front corner of the chassis frame, and handle bar means is connected to the rear compartment or to the rear end of the chassis frame to propel the vehicle.

---

This invention relates to a wheeled vehicle and has for its primary object the provision of a body mounted on a chassis frame with the body divided by a partition to provide a front compartment open at its top and a rear compartment open at its rear to serve as a storage compartment or a compartment provided with seating and restraining means for an infant.

Another object of this invention is to provide substantially centrally of the chassis frame a transverse axle on each end of which is mounted a bell crank on one arm of which is a stub axle on which is rotatably mounted a three-arm spider wheel support with each arm carrying at its free end a rotatable wheel adaptable to move the vehicle up or down over a curb or stair way.

Still another object of this invention is to provide spring means connecting the other arm of each bell-crank to a fixed part of the vehicle body.

Yet another object of this invention is to provide a caster wheel support at each forward corner of the chassis frame.

A further object of this invention is to provide at the rear of the rear compartment a handle bar means providing a pair of push-pull arms.

Another object of this invention is to provide on each push-pull arm a vertical support rod to engage a surface elevated above the surface engaged by the wheels of the wheel support so as to hold the vehicle body in a substantially horizontal position.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described within the scope of the appended claims.

FIGURE 1 is a perspective view of the stair climbing wheeled vehicle.

FIGURE 2 is a fragmentary end view thereof.

Referring now in detail to the drawings, the vehicle made in accordance with my invention is a hand propelled shopping cart 10 mounted on a wheel supported chassis to be hereinafter described. The cart 10 is preferably compartmentized such as to provide a forward article receiving compartment 12 and a forward compartment 14 that may be designed for storage or transport of articles or material, but in the form illustrated in FIG. 1 compartment 14 is provided with a seat 15 for an infant, a restraining bar 16 that may be raised or lowered in any suitable manner and a detachable holding strap 17 to be fitted and/or applied between the legs of the infant in the manner well known. Also there may be provided within compartment 14 a back support or cushion 18.

The body of the cart 10 is formed of a rectangular base 20 made of metal rods or metal tubular stock having side rails 21, 22 and front and rear rails 23, 24. Extending longitudinally between the front and rear rails 23, 24 are transversely spaced rods 25 rigidly secured in any desired manner to the front and rear rails. The vertical sides 27, 28 and front side 29 of the cart 10 are formed similar to the base 20 with all parts rigidly interconnected to form a rigid box like structure open at its rear end. A panel (not shown) forms a rigid partition dividing the box like structure into the compartments 12 and 14. The sides of compartment 14 may be wholly enclosed either by rigid panels or fabric panels 30, 32 which may be either permanently secured to the sides 27, 28 or may be detachable therefrom in any desired manner. Compartment 14 is also provided with a cover or top 34 which may be optionally raised or lowered along its front edge 35, in the direction as indicated by curved arrow A, and may serve as a closure for the open top of the front compartment. Preferably top 34 is provided with a depending flange 36 which overhangs the top edges of side panels 30, 32 and the top of the rear open end of compartment 14 when the top or cover 34 is in the down position.

Extending rearwardly from the vertical sides 30, 32 of compartment 14 and adjacent to end rail 24 of base 20 is a pair of push-pull handle bars 40, 41, the lower ends of which are substantially horizontal as at 42, 43 and suitably secured either rigidly or pivotally (not shown) to the vertical rails 45, 46 defining the rear vertical side edges of vertical sides 30, 32. Depending respectively from each horizontal portion 42, 43 is a vertical support rod 48, 49 rigidly secured thereto for a purpose to be hereinafter described.

Depending respectively from each of the side rails 21, 22 of cart base 20 is a vertical bracket 50, 52. The brackets 50, 52 are transversely aligned and disposed slightly forwardly of the center of side rails 21, 22. Supported by the brackets 50, 52 is an axle 54 whose terminal end portions extend outwardly beyond each associated supporting bracket. Rotatably mounted on each of the terminal ends of the axle 54 is a bell-crank lever 56 having an upstanding arm 57 and a substantially horizontal arm 58. Provided on each horizontal arm 58 adjacent its free end is a stub axle 59. Rotatably mounted on each stub axle 59 is a three-arm spider wheel support 60, and suitably rotatably mounted on the free end of each of the arms 61, 62, 63 respectively are wheels 64, 65, 66. It is to be noted that the arms 61, 62, 63 are spaced pairs between the ends of which the wheels are mounted and provided between the arms at the lower juncture thereof is a hub 68 which is journaled on the stub-axle.

Suitably secured vertically above each of the bell-cranks 56 is a curved leaf spring bracket 70, the bracket 70 being attached to the sides of the cart 10 or to the back partition wall of the front compartment. A tension coil spring 72 is provided for each bell-crank 56 having its lower end attached to the upper terminal end of upstanding arm 57 and its upper end to leaf spring bracket 70. The tension of coil springs 72 serve to hold the bell-cranks 56 in their normal position so that on a normal level surface 74 two wheels of the three wheel support 60 will always have traction thereon, or when the cart is pulled over a curb or stair 75, wheel 64 will engage the rise of the curb or stair while pulling on the handle bars 40, 41 will impart a clockwise turning of the wheel supports 60 in the direction of arrow B to bring wheel 65 into tractive engagement with surface 76 of the pavement or tread of the stair. This movement will impart in effect an elevation of the axle 54 such as to turn the bell-cranks 56 clockwise, the tension springs 72 operating to properly support the bell-cranks as well as the cart body in its relation to the wheels of the wheel supports 60.

It is to be noted that in the position of the cart 10 as shown in FIG. 1 the lower terminal ends of vertical support rods 48, 49 will abut the surface of the pavement or stair tread 76 elevated above surface 74, thus supporting the cart in a substantial horizontal position.

At each forward corner of base 20 of the cart there is suitably mounted a caster wheel 80, which function to rotatively engage a lower surface such as 74 when the cart is moved down a curb or stairway.

While certain novel feathres of my invention have been shown and described and are pointed out in the annexed claims, it will be understood that various omissions, substitutions and changes in the forms and details of the vehicle illustrated and in its operation can be made by those skilled in the art without departing from the spirit of the invention.

Having thus described my invention, I claim as new and desire to secure by Letters Patent:

1. A vehicle comprising:
  (a) a cart body having front and rear compartments,
  (b) a chassis frame supporting both said compartments,
  (c) a transverse axle supported beneath said chassis frame with its terminal ends projecting laterally beyond each side thereof,
  (d) a bell-crank rotatably mounted on each terminal end of said axle,
  (e) a three-arm spider wheel support supported by one arm of said bell crank,
  (f) spring means connecting the other arm of said bell-crank to a fixed part of one of said compartments,
  (g) a wheel rotatably mounted at the terminal end of each of the arms of the three-arm spider wheel support,
  (h) handle bar means secured to the rear of said body, and
  (i) a caster wheel mounted at each of the front corners of said chassis frame.

2. The vehicle of claim 1, wherein:
  (a) said front compartment is open at its top,
  (b) said rear compartment is open at its rear side,
  (c) a vertical partition dividing said front and rear compartments, and
  (d) said handle bar means including a pair of push-pull arms each connected to the rear end portions of said chassis frame.

3. The vehicle of claim 2, including:
  (a) a vertical support rod secured to each push-pull arm of said handle bar means, and
  (b) the lower terminal end of each support rod being vertically spaced from the surface engaged by at least one of the wheels of the wheel support.

4. The vehicle of claim 4, wherein said spring means comprises:
  (a) a substantially horizontal arm,
  (b) a stub axle at the free end of the horizontal arm,
  (c) each stub axle rotatably mounting an associated three-arm spider wheel support, and
  (d) an upstanding arm on each said bell crank connected to said spring means.

5. The vehicle of claim 4, wherein said spring means comprises:
  (a) a curved leaf spring bracket secured to said vertical partition panel, and
  (b) a tension coil spring connected at its upper end to said leaf spring bracket and at its lower end to the upper free end of the upstanding arm of said bell-crank.

6. The vehicle of claim 5, including:
  (a) a bracket support depending from said chassis frame at each side thereof and in transverse opposed relation,
  (b) said brackets supporting said transverse axle,
  (c) said brackets being disposed slightly forwardly of the center of said chassis frame, and
  (d) the terminal ends of said axle extending laterally outwardly beyond each associated bracket.

7. The vehicle of claim 6, wherein said rear compartment includes:
  (a) a seat for an infant,
  (b) a swingable restraining rod,
  (c) a cushion back, and
  (d) a holding strap.

8. The vehicle of claim 7, including:
  (a) a closure top for said rear compartment, and
  (b) means hingedly securing said closure top to said vertical partition whereby the same may be swung upwardly and backwardly to serve as a closure for the top open end of said front compartment.

9. The vehicle of claim 8, including:
  (a) a side panel at each side of said rear compartment, and
  (b) a depending flange along the sides and front of said cover top adapted to overhang the upper outer sides of said side panels and the top of the rear open side.

10. The vehicle of claim 9, wherein said chassis frame comprises:
  (a) longitudinal side rails and transverse end rails rigidly secured together,
  (b) longitudinal transversely spaced rods secured at their ends to said transverse end rails, and
  (c) said front caster wheels being located above the surface engaged by two of the wheels of the wheel support when the vehicle is in its normal horizontal position.

References Cited

UNITED STATES PATENTS

| | | | |
|---|---|---|---|
| 1,191,394 | 7/1916 | Brown et al. | 280—5.26 |
| 1,887,427 | 11/1932 | Porcello | 280—5.28 |
| 2,014,060 | 9/1935 | Albrecht | 280—87.03 X |
| 2,981,546 | 4/1961 | Letourneur | 280—5.28 |
| 2,997,311 | 8/1961 | Umanoff. | |
| 3,269,741 | 8/1966 | Porcello | 280—5.26 |

LEO FRIAGLIA, Primary Examiner

U.S. Cl. X.R.

280—33.99